(12) United States Patent
Bjerkholt

(10) Patent No.: US 8,547,793 B2
(45) Date of Patent: Oct. 1, 2013

(54) CORRECTION OF VELOCITY CUBES FOR SEISMIC DEPTH MODELING

(75) Inventor: Boerre Bjerkholt, Langhus (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 782 days.

(21) Appl. No.: 12/686,789

(22) Filed: Jan. 13, 2010

(65) Prior Publication Data
US 2010/0195440 A1 Aug. 5, 2010

Related U.S. Application Data

(60) Provisional application No. 61/149,947, filed on Feb. 4, 2009.

(51) Int. Cl.
*G01V 1/00* (2006.01)
(52) U.S. Cl.
USPC ............................................................ 367/73

(58) Field of Classification Search
USPC ........................................ 367/38, 73; 703/10
See application file for complete search history.

(56) References Cited

U.S. PATENT DOCUMENTS

| | | | |
|---|---|---|---|
| 5,555,218 A | 9/1996 | Chambers | |
| 5,648,937 A * | 7/1997 | Campbell | ........................ 367/27 |
| 6,901,332 B2 | 5/2005 | Hill | |
| 7,525,874 B2 | 4/2009 | Robinson | |
| 2007/0021951 A1* | 1/2007 | Lee Seislink | .................... 703/10 |

* cited by examiner

*Primary Examiner* — Krystine Breier
(74) *Attorney, Agent, or Firm* — Lam Nguyen; Rodney Warfford

(57) ABSTRACT

Systems and methods perform correction of velocity cubes for seismic depth modeling. An example system receives a velocity model defined in the time domain for seismic modeling of a subsurface earth volume and receives well depth data associated with the subsurface earth volume. The system updates an average velocity cube associated with the velocity model to correct depth-converted time horizons to accord with known well markers, thereby increasing the accuracy and correctness of the velocity model.

14 Claims, 16 Drawing Sheets

EXAMPLE METHOD
1600

COMBINE WELL MARKERS IN NEIGHBORING CELLS OF AN AVERAGE VELOCITY CUBE INTO GROUPS
1602

ESTIMATE AN AVERAGE VELOCITY IN CELLS THAT SURROUND THE WELL MARKERS BY MINIMIZING AN ERROR IN AVERAGE VELOCITY FOR EACH GROUP
1604

UPDATE THE AVERAGE VELOCITY CUBE WITH THE ESTIMATED AVERAGE VELOCITY CELL VALUES TO CORRECT TIME HORIZONS TO THE WELL MARKERS
1606

FIG. 16

US 8,547,793 B2

CORRECTION OF VELOCITY CUBES FOR SEISMIC DEPTH MODELING

RELATED APPLICATIONS

This patent application claims priority to U.S. Provisional Patent Application No. 61/149,947 to Børre Bjerkholt, entitled, "Correction of a Velocity Cube in a Layer Cake Velocity Model," filed Feb. 4, 2009, and incorporated herein by reference in its entirety.

BACKGROUND

Subsurface modeling for petroleum exploration or geological modeling often uses a layer cake velocity model consisting of layers of time horizons and the zones between them. These depict the velocity at different depths and thus the travel time of seismic waves, acoustic or vibrational, artificially generated to "see" the structures and features of the underground. Such a velocity model defined in time has an internal velocity field, for example, a velocity cube that represents a kind of 3-dimensional matrix corresponding to the subsurface earth volume, and used for converting (e.g., back and forth) between time and depth parameters when constructing a subsurface model. An average velocity cube, for example, enables domain-conversion of entire surfaces, not just individual data points rendered one at a time.

The boundaries or horizons of underground layers are approximated fairly well from the seismic reflection data. The approximated horizons, however, are not nearly as exact as the known depths of certain data points known as well markers. What is needed is a way to reconcile an entire velocity cube with the exactness of hard well marker data, so that the corrected velocity cube, in turn, can accurately model entire underground surfaces and volumes.

SUMMARY

Systems and methods perform correction of velocity cubes for seismic depth modeling. An example system receives a velocity model defined in the time domain for seismic modeling of a subsurface earth volume and receives well depth data associated with the subsurface earth volume. The system updates an average velocity cube associated with the velocity model to correct depth-converted time horizons to accord with known well markers, thereby increasing the accuracy and correctness of the velocity model.

In one implementation, an example system inputs a velocity model with an internal velocity cube and horizons defined in time, and inputs well markers defined in depth. The system extracts uncorrected average velocity surfaces for all the time horizons using the input velocity cube and the input time horizons, and extracts average velocities for all well markers. The example system also extracts average velocities at thin zones in the velocity model. Next, the system calculates the corrected average velocity surfaces for all the time horizons and calculates correction factor surfaces for all the time horizons. The correction factor surfaces enable the example system to calculate a corrected average velocity cube. Finally, the system performs an additional exact correction to hard data of known well markers by grouping well markers, estimating average velocities in cells surrounding each group, and updating the average velocity cube with the estimated average velocities of the cells. This provides a corrected average velocity cube with time horizons, which when depth-converted, match the depth values of known well markers.

This summary section is not intended to give a full description of correction of velocity cubes for seismic depth modeling, or to provide a comprehensive list of features and elements. A detailed description with example implementations follows.

BRIEF DESCRIPTION OF THE DRAWINGS

FIG. 16 is flow diagram of an example method of exact correction of time horizons to well data in an average velocity cube.

DETAILED DESCRIPTION

Overview

This disclosure describes systems and methods for correcting velocity cubes used in seismic depth modeling. In one implementation, a system creates a velocity model that has an improved internal velocity field, enabling improved domain-conversion of objects (points, surfaces, horizons, etc.) between time and depth. The improved velocity model has a higher overall accuracy than similar conventional velocity models. The improved velocity field, such as an average velocity cube, is more faithfully calibrated, with surfaces registered to hard data, such as well markers. The system gives full respect to known data, such as well markers, by harmonizing the velocity cube in accordance with the hard data. The system uses innovative techniques to perform the correction of a velocity cube.

Figure 1:
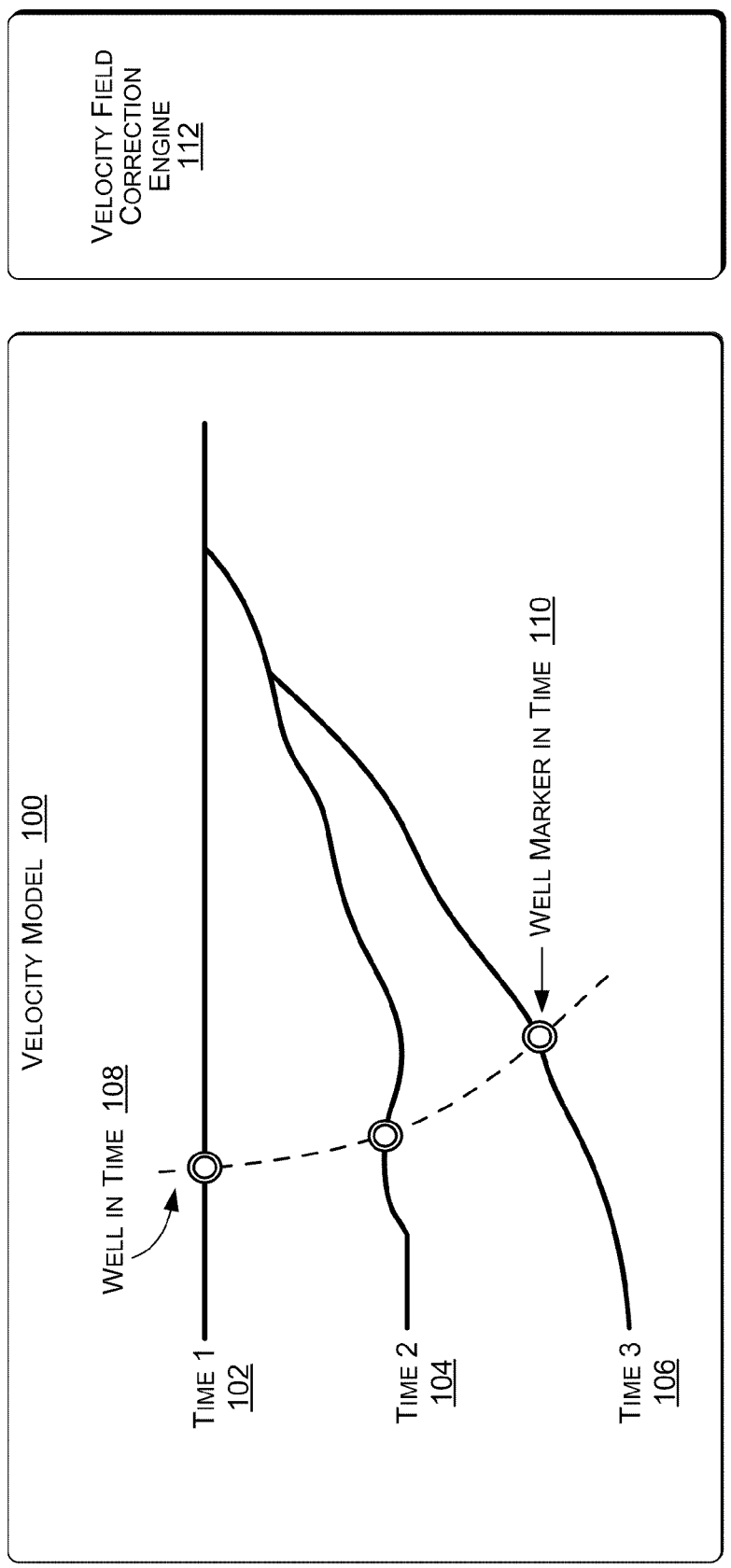
FIG. 1 is a diagram of example velocity model defined in time and an associated velocity field correction engine.

FIG. 1 shows a layer cake velocity model defined in the time domain that consists of layers of time horizons 102, 104, and 106. The spaces between horizons are called zones. The velocity model 100 has an internal velocity field that can be represented by different types of velocity objects. A well 108 is shown in the time domain as a well marker 110 that has a trajectory in time in the velocity model 100. A velocity field correction engine 112 tunes or corrects the inherent velocity object underlying the velocity model 100 so that the velocity field is firmly based on available hard data in the velocity model 100. The terms "correction" and "correct" as used herein mean, as above, that an example system or method improves the accuracy of a velocity object, such as an average velocity cube, so that the overall data of the velocity object corresponds more closely to hard or "known" data points.

Figure 2:
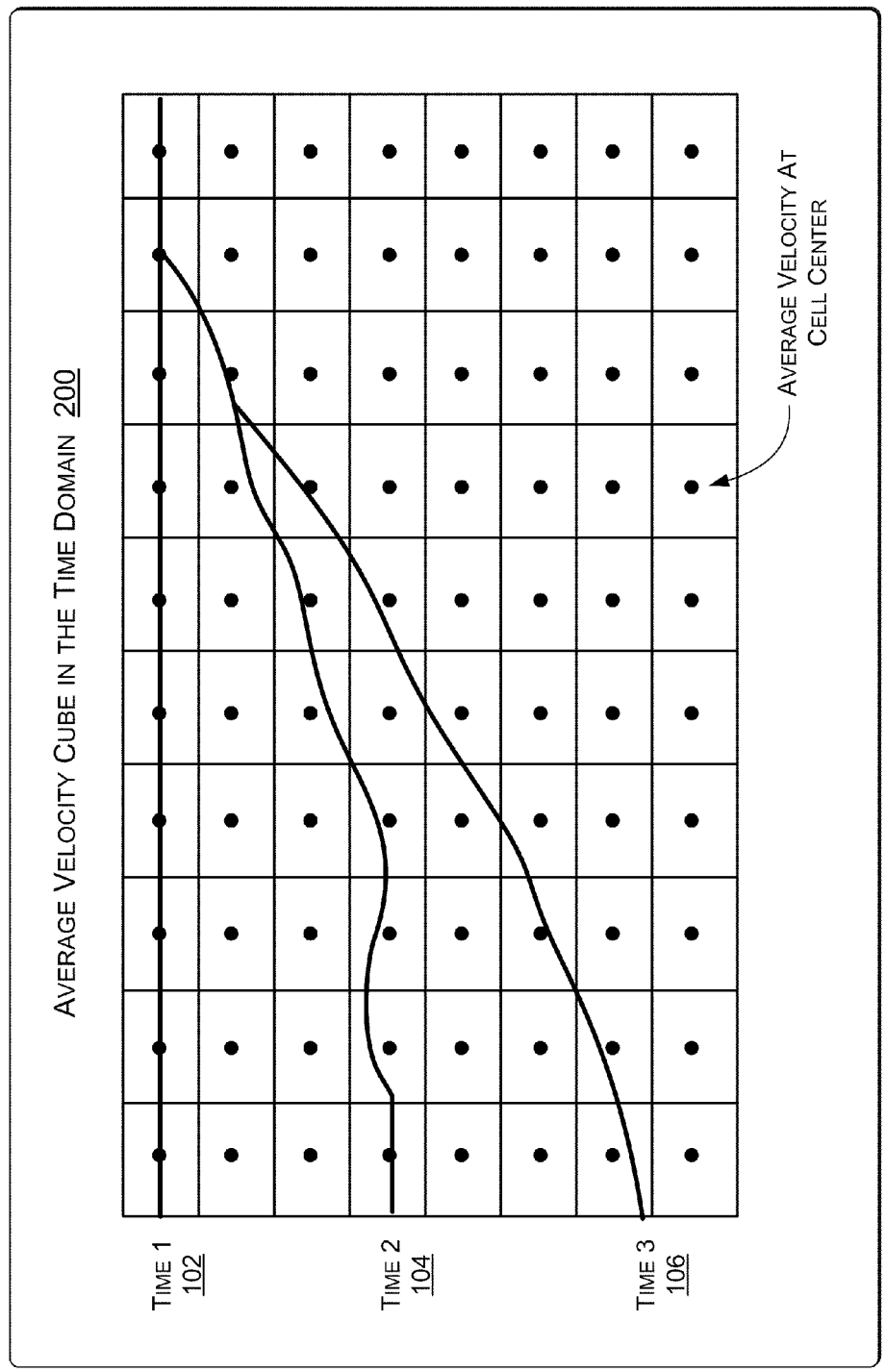
FIG. 2 is a diagram of an example average velocity cube defined in the time domain.

FIG. 2 shows an example average velocity cube 200 in the time domain, and which covers the time horizons 102, 104, 106 and zones in-between the horizons.

Figure 3:
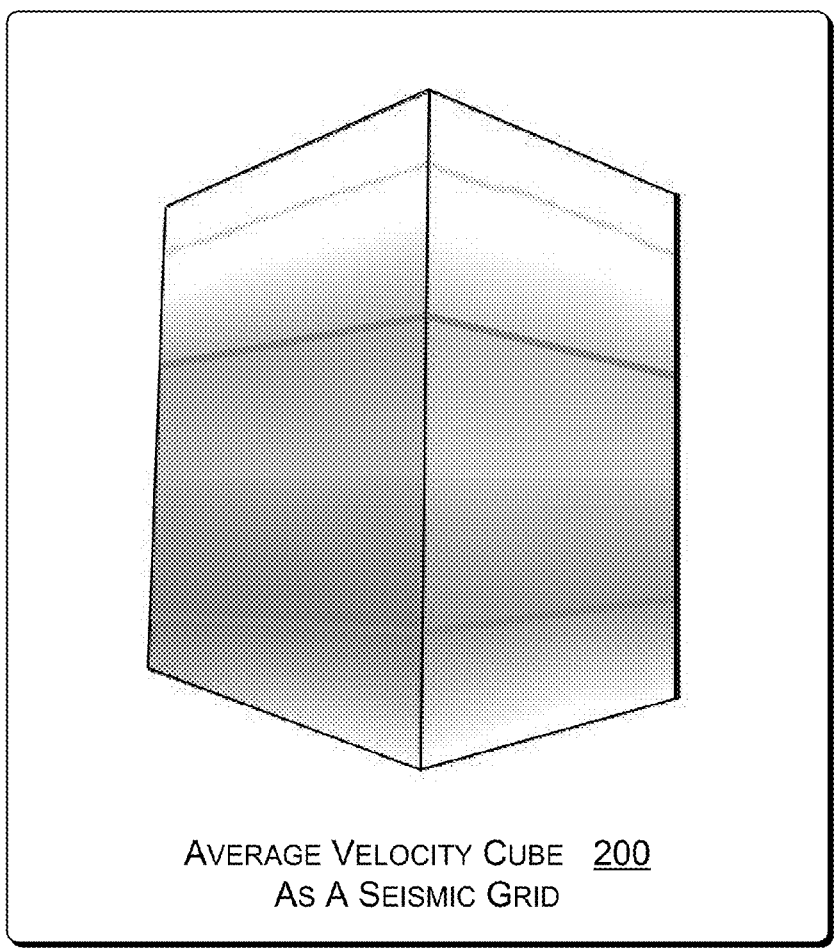
FIG. 3 is a diagram of an example average velocity cube as a seismic grid.
Figure 4:
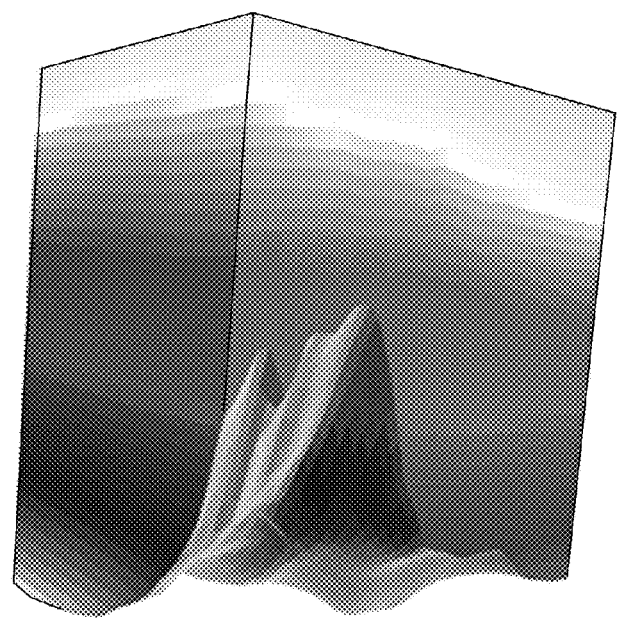
FIG. 4 is a diagram of an example average velocity cube as a 3-dimensional grid property.

The velocity cube 200 can be represented as a seismic grid, as shown in FIG. 3, or as a 3-dimensional grid property, as shown in FIG. 4. The velocity in the velocity model 100 can be represented, for example, by an instantaneous velocity cube 200 or an average velocity cube 200, each defined in the time domain. This description uses average velocity cubes 200 as a representative example, since an instantaneous velocity cube 200 can be converted to an average velocity cube 200, and vice versa.

Figure 5:
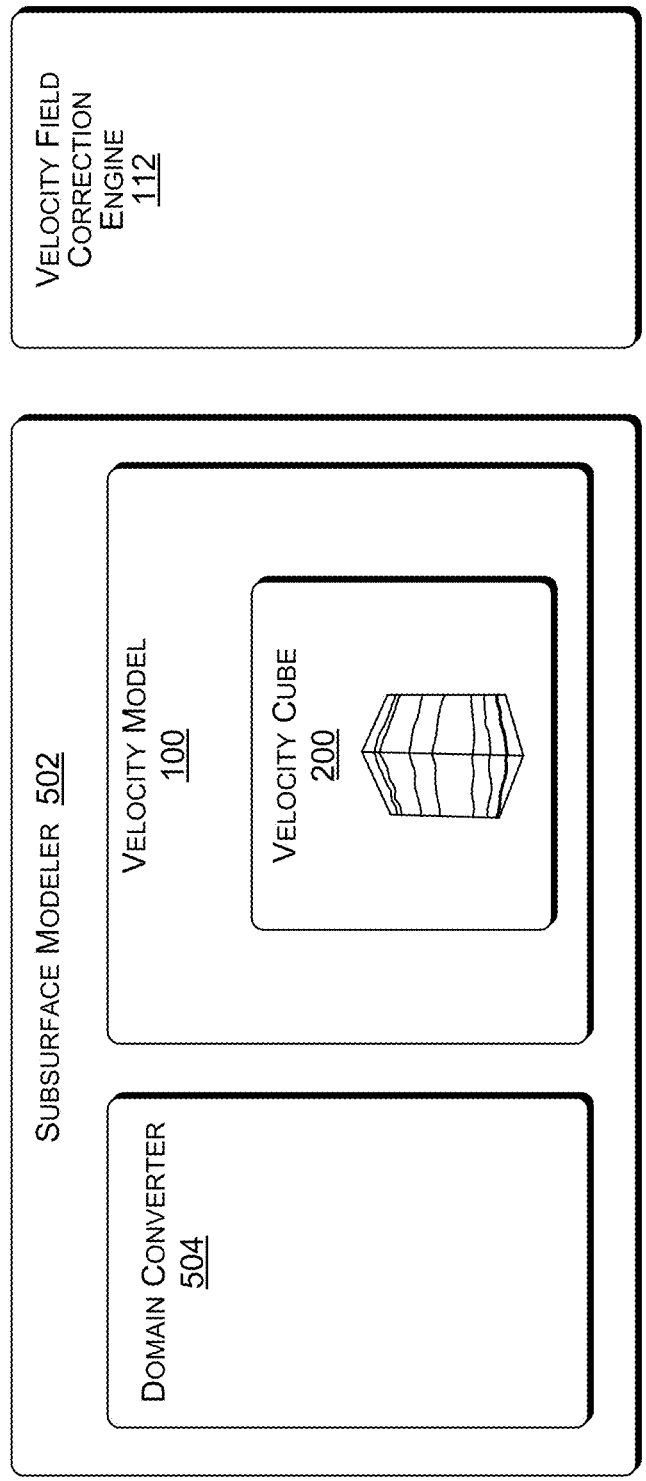
FIG. 5 is a block diagram of an example subsurface modeler and an associated velocity field correction engine.

FIG. 5 shows an example context of the velocity model 100 in which the velocity object representing the velocity field is a velocity cube 200. The velocity model 100 typically supports a subsurface modeler 502, which may perform seismic depth modeling and imaging of the topography of subsurface layers and features. In this description, the velocity field is given by an average velocity cube 200, which as a descriptive example, is representative of other kinds of velocity objects. In one implementation, the velocity cube 200 enables a domain converter 504 to convert points, surfaces, horizons, volumes, etc., from the time domain to the depth domain.

Example Modeling Environment

Figure 6:
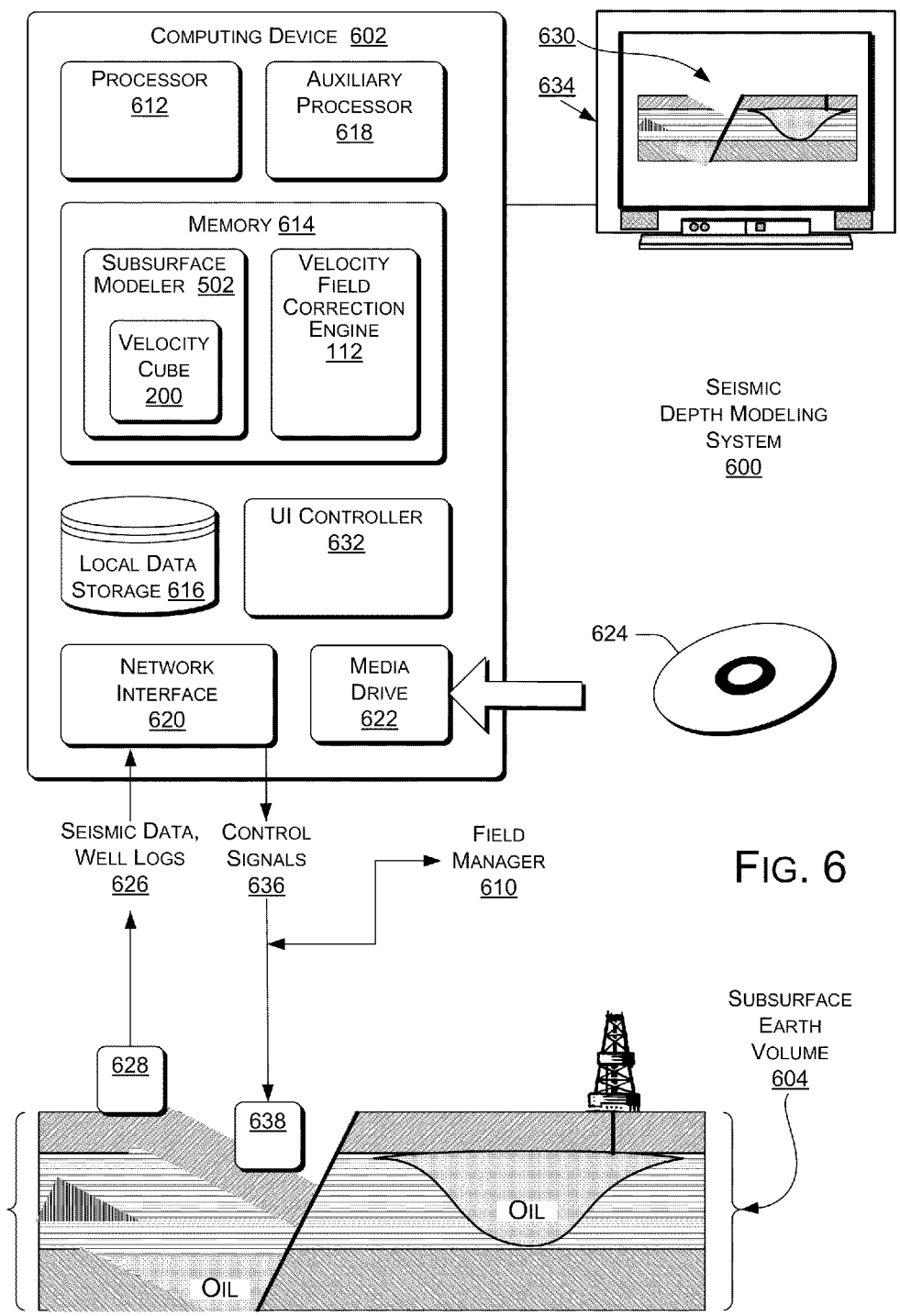
FIG. 6 is a block diagram of an example seismic depth modeling system.

FIG. 6 shows an example seismic depth modeling system 600. A computing device 602 implements components, such as an innovative velocity field correction engine 112 to improve performance of the subsurface modeler 502 for modeling a subsurface earth volume 604. The subsurface earth volume 604 may include, for example, various earth layers, a petroleum reservoir, depositional basin, or other features. The velocity field correction engine 112 and the subsurface modeler 502 are illustrated as software, but can be implemented as hardware or as a combination of hardware and software instructions.

In the illustrated example, the computing device 602 is communicatively coupled via sensory and control devices with a real-world subsurface earth volume 604, i.e., an actual earth volume, petroleum reservoir, depositional basin, oilfield, wells, surface control network, etc., and may also be in communication with one or more human agents, such as a geologist, monitor, field manager 610, etc. Although the computing device 602 is shown specifically in communication with a petroleum resource, the computing device 602 may be in communication with any subsurface earth volume 604, since the subsurface earth volume 604 being modeled may only be a candidate for petroleum production or other use.

The computing device 602 may be a computing network, computer, or other device that has a processor 612, memory 614, data storage 616, and other associated hardware such as an optional auxiliary processor 618, network interface 620 and a media drive 622 for reading and writing to a removable storage medium 624. The removable storage medium 624 can be, for example, a compact disk (CD); digital versatile disk/ digital video disk (DVD); flash drive, etc. The subsurface modeler 502 may include at least access to a velocity model 100 and velocity cube 200.

The removable storage medium 624 may include instructions for implementing and executing the velocity field correction engine 112 and the subsurface modeler 502. At least some parts of the velocity field correction engine 112 can be stored as instructions on a given instance of the removable storage medium 624, removable device, or in local data storage 616, to be loaded into memory 614 for execution by the processor(s) 612, 618.

Although the illustrated velocity field correction engine 112 is depicted as a program residing in memory 614, the velocity field correction engine 112 may also be implemented as specific hardware, such as an application specific integrated circuit (ASIC) or as a combination of hardware and software.

In this example system 600, the computing device 602 receives velocity model data, such as that derived from seismic data and well logs 626 from a connected device 628 in communication with, and collecting data from, geophones or other sensors for a potential petroleum field or other subsurface earth volume 604, through the network interface 620. The subsurface modeler 502 may create a structural model 630 of the subsurface earth volume 604. A user interface controller 632 displays the structural model 630 and user interface controls, typically on a computer display 634.

Based on action of the velocity field correction engine 112 and the subsurface modeler 502, the computing device 602 can generate control signals 636 to be used via control devices 638 in real world prospecting, modeling, exploration, prediction, and/or control of resources, such as petroleum production, including direct control via the hardware control devices 638 of such machinery and hardware as injection and production wells, reservoirs, fields, transport and delivery systems, and so forth.

Example Engine

Figure 7:
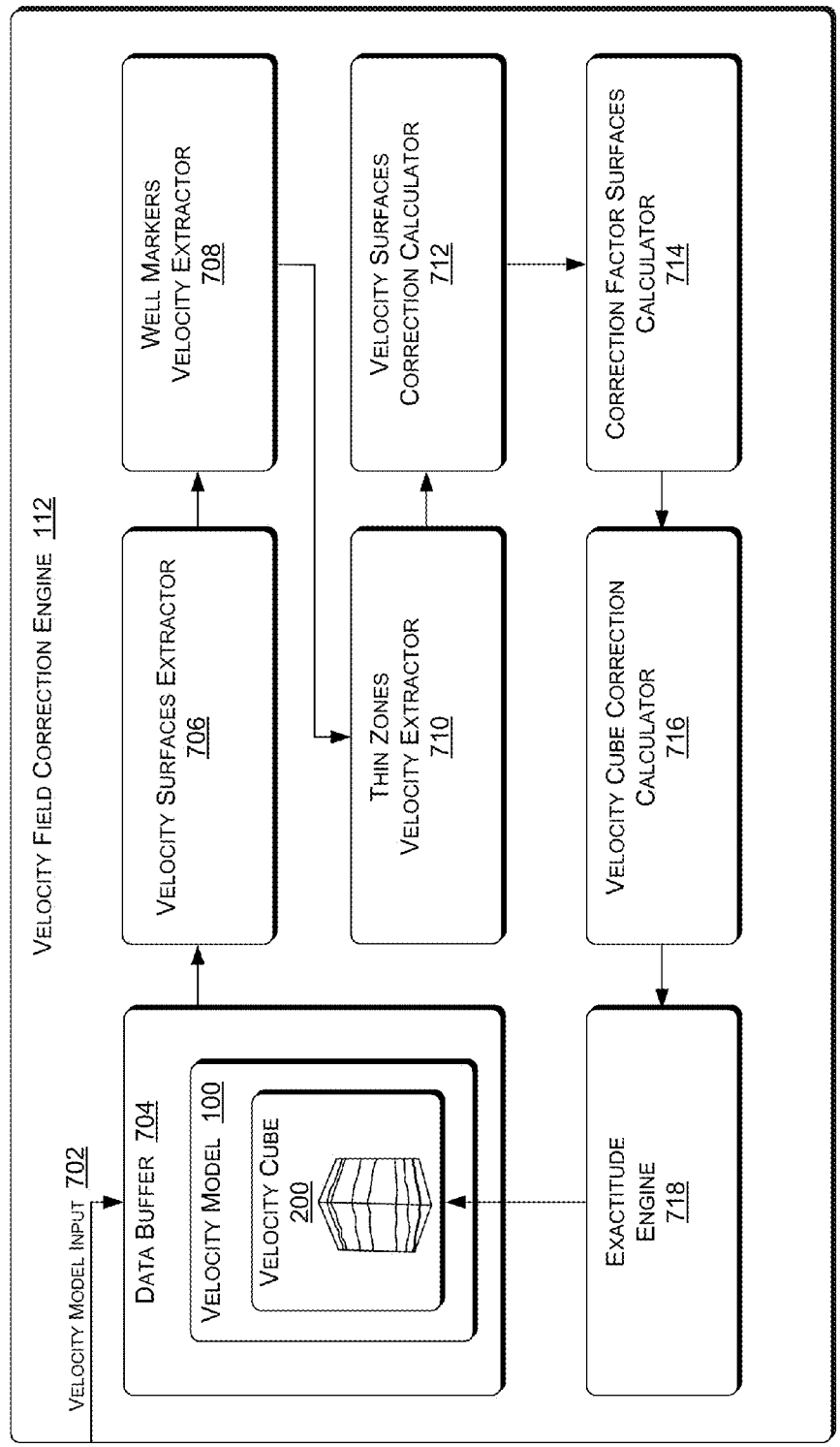
FIG. 7 is a block diagram of the example velocity field correction engine in greater detail.

FIG. 7 shows the example velocity field correction engine 112 of FIGS. 1, 2, and 5 in greater detail. The illustrated implementation is only one example configuration, to introduce features and components of an engine that corrects a velocity object of a velocity model 100 used in seismic depth modeling. Many other arrangements of the components of a velocity field correction engine 112 are possible within the scope of the subject matter. As introduced above, the velocity field correction engine 112 can be implemented in hardware, or in combinations of hardware and software. Illustrated components are communicatively coupled with each other for communication and data exchange as needed.

The illustrated example velocity field correction engine 112 includes a data input 702 and/or data buffer 704 for receiving velocity model 100 and velocity cube 200 data. This example velocity field correction engine 112 operates on average velocities, but could also operate on instantaneous velocities, and includes a velocity surfaces extractor 706, a well markers velocity extractor 708, a thin zones velocity extractor 710, a velocity surfaces correction calculator 712, a correction factor surfaces calculator 714, a velocity cube correction calculator 716, and an exactitude engine 718. The exactitude engine 718 corrects time horizons in the average velocity cube 200 to well markers data with high quality and relative exactitude. These components, and operation of the example velocity field correction engine 112, will now be described in greater detail.

Average Velocity Cubes

Figure 8:
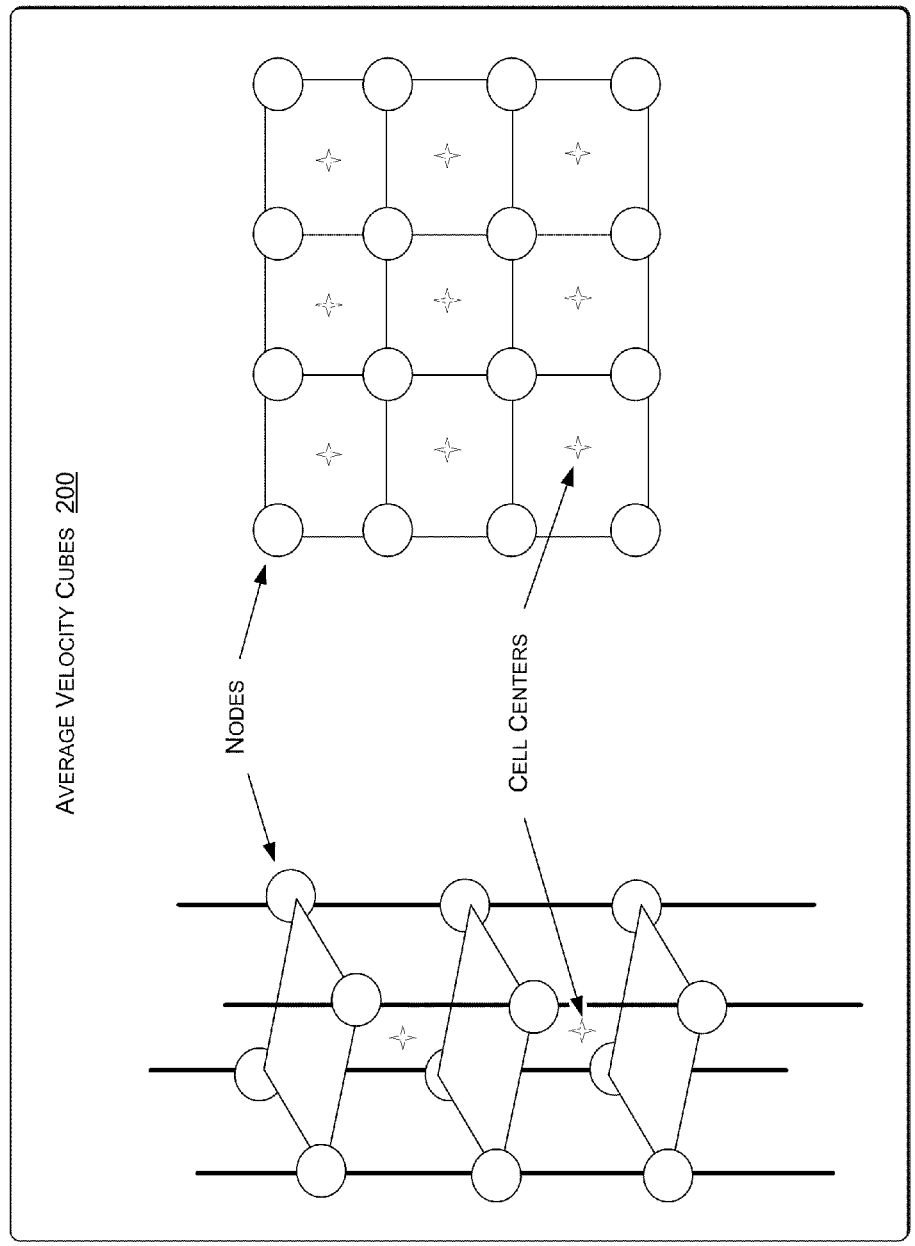
FIG. 8 is a diagram of example cell structure of an average velocity cube.

As shown in FIG. 8, each cell in an average velocity cube 200 has an average velocity value that is defined in the cell center. The velocity field correction engine 112 or the subsurface modeler 502 may obtain the average velocity at a given time vertex (x,y,t) by interpolating on the average velocity cube 200, as in Equation (1):

$$\bar{v}_I = \text{interpolate}(x,y,t) = f(\bar{v}_{NC_1}, \bar{v}_{NC_2}, \ldots, \bar{v}_{NC_n}, x, y, t) \qquad (1)$$

where the interpolated value is found using an interpolation routine. Commonly, the interpolated value is obtained by using average velocity in the cells $\bar{v}_{NC_1}, \bar{v}_{NC_2}, \ldots, \bar{v}_{NC_n}$ surrounding the target vertex cell.

Domain Conversion

Figure 9:
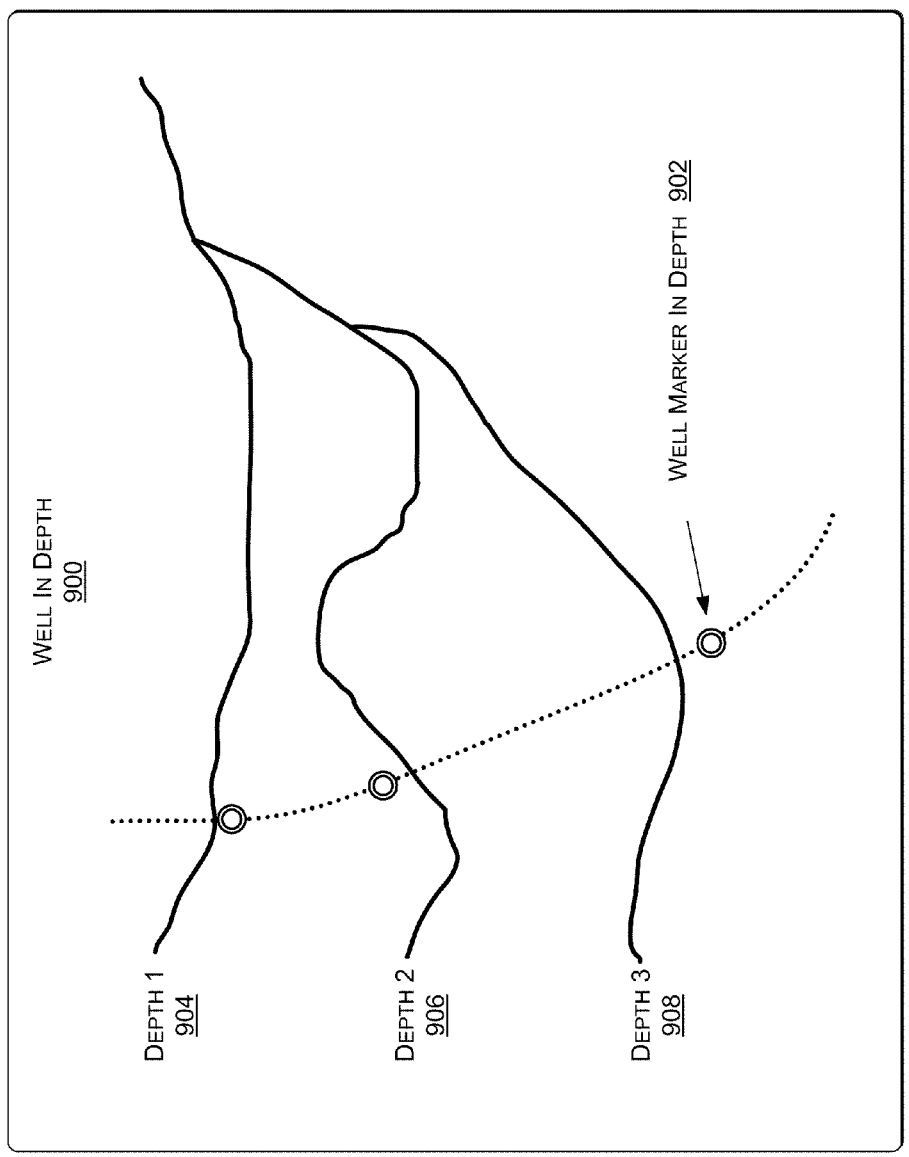
FIG. 9 is a diagram of example well data in a depth-converted model.
Figure 10:
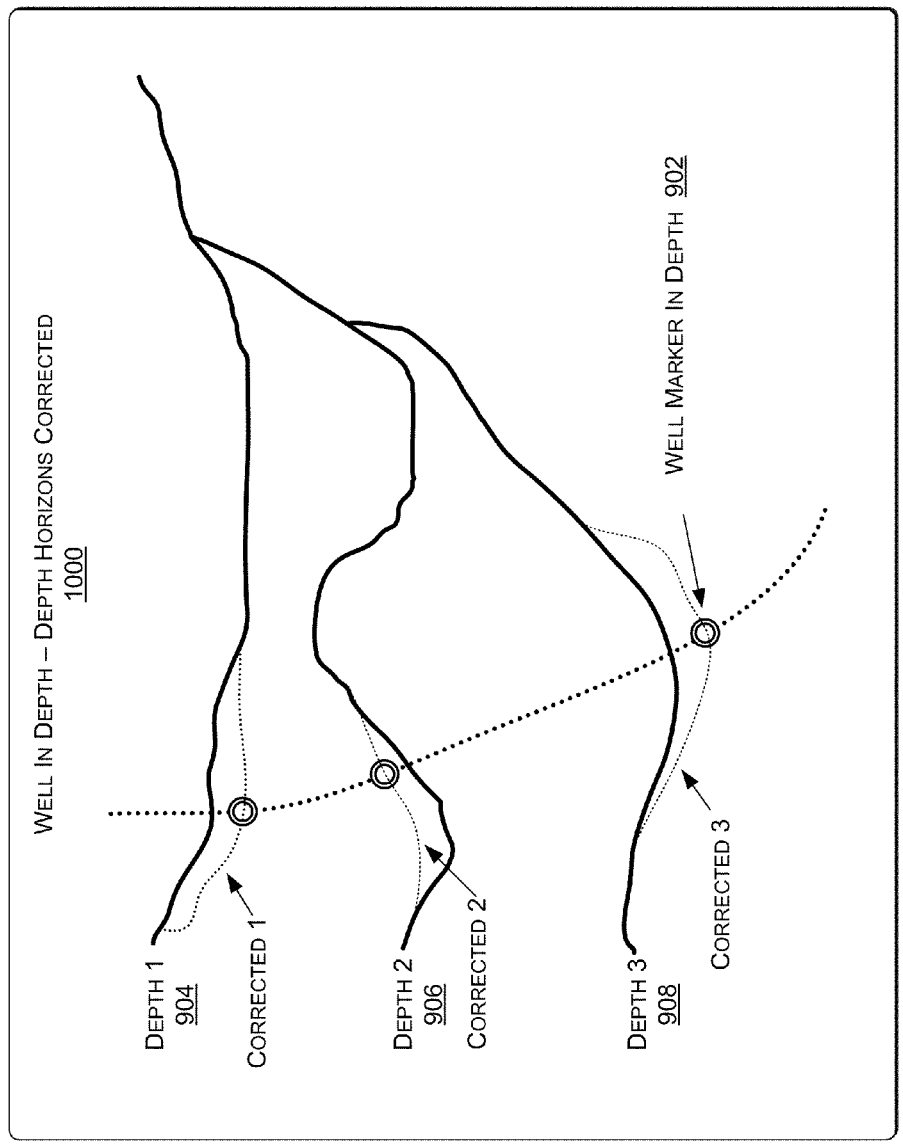
FIG. 10 is a diagram of example depth horizons corrected to well marker data.

The domain converter 504 or the velocity field correction engine 112 can convert the time horizons 102, 104, 106 in the layer cake velocity model 100 to depth by using the following relationship given in Equation (2):

$$z = z_D + \bar{v}(t - t_D) \qquad (2)$$

where z is the depth-converted time, t is the time, $z_D$ is the depth at a datum, $t_D$ is the time at the datum, and $\bar{v}$ is the average velocity at t. FIG. 9 shows an appearance of the velocity model 100 after conversion to depth, i.e., to a well in depth 900. There are typically well markers 902 that indicate where the wells cross the depth horizons 904, 906, 908. FIG. 10 shows that the depth-converted horizons 904, 906, 908, before correction, do not match the well markers 902 in depth. The velocity field correction engine 112 performs the important function, especially from a user's standpoint, of correcting the velocity cube 200. This ultimately enables harmonization of the depth converted horizons 904, 906, 908 with the well markers 902 in depth, an important correction because it is undesirable to proceed with a defective model in which it is known that the depth surfaces do not agree with specific, known depth points that are known to be located on the actual depth surfaces.

Example Correction of Average Velocity Cubes

The velocity field correction engine 112 performs correction of the average velocity cube 200, with the goal of fitting depth-converted horizons to the well markers in depth 902. In one implementation, each component of the velocity field correction engine 112 plays a part in correcting an average velocity cube 200.

After input 702 of velocity model information, such as input of elements of the velocity model 100 (in the time domain) and corresponding velocity cube 200 into a data buffer 704, e.g., staked out in memory 614, the velocity surfaces extractor 706 extracts average velocity surfaces $\bar{v}_S$ for all the time horizons. For example, the average velocity can be extracted using the interpolation routine defined in the function shown above in Equation (1).

Next, the well markers velocity extractor 708 extracts the average velocity from the well marker data points 110, denoted by $\bar{v}_M$. This extraction of the average velocity of the well markers 110 can be accomplished by Equation (3):

$$\bar{v}_M = \frac{z_M - z_D}{t_B - t_D} \qquad (3)$$

where $z_m$ is the depth at the well marker 110, $t_B$ is the time at the base horizon, $z_D$ is the depth at datum, $t_D$ is the time at datum and $\bar{v}_M$ is the average velocity at the well marker 110.

Figure 11:
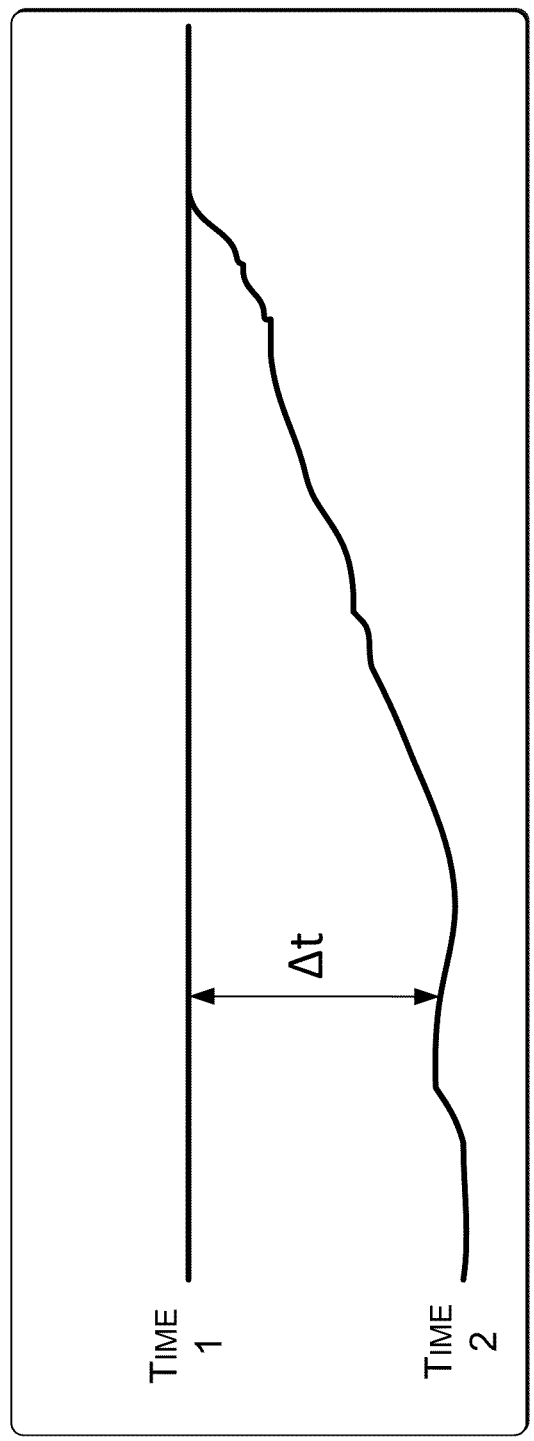
FIG. 11 is a diagram of example extraction of a time thickness surface.

Next, the thin zones velocity extractor 710 aims to ensure that the average velocity is substantially equal for all the horizons in thin zones. If the average velocity is not equal for all horizons in the thin zones, then an unsatisfactory average velocity cube 200 may result, including spiky depth horizons in the thin zones. The thin zones velocity extractor 710 first extracts time thickness surfaces by applying Equation (4):

$$\Delta t = |t_2 - t_1| \qquad (4)$$

where, as shown in FIG. 11, $t_2$ is the time at the base horizon and $t_1$ is the time at the top horizon.

Then the thin zones velocity extractor 710 calculates the average velocity surfaces in the thin zones by using Equation (5):

$$\bar{v}_{\Delta t \leq \alpha} = \begin{cases} \bar{v}_T, & \Delta t \leq \alpha \\ UNDEF, & \Delta t > \alpha \end{cases} \qquad (5)$$

where $\bar{v}_{\Delta t \leq \alpha}$ is the average velocity in the thin zones, $\bar{v}_T$ is the average velocity at the top horizon, and $\alpha$ is the thickness tolerance. Nodes in the surfaces are converted to points, and added to the well marker points using Equation (6):

$$\bar{v}_P = \bar{v}_M + \bar{v}_{\Delta t \leq \alpha} \qquad (6)$$

where $\bar{v}_P$ represents all the points to be used in the correction.

Figure 12:
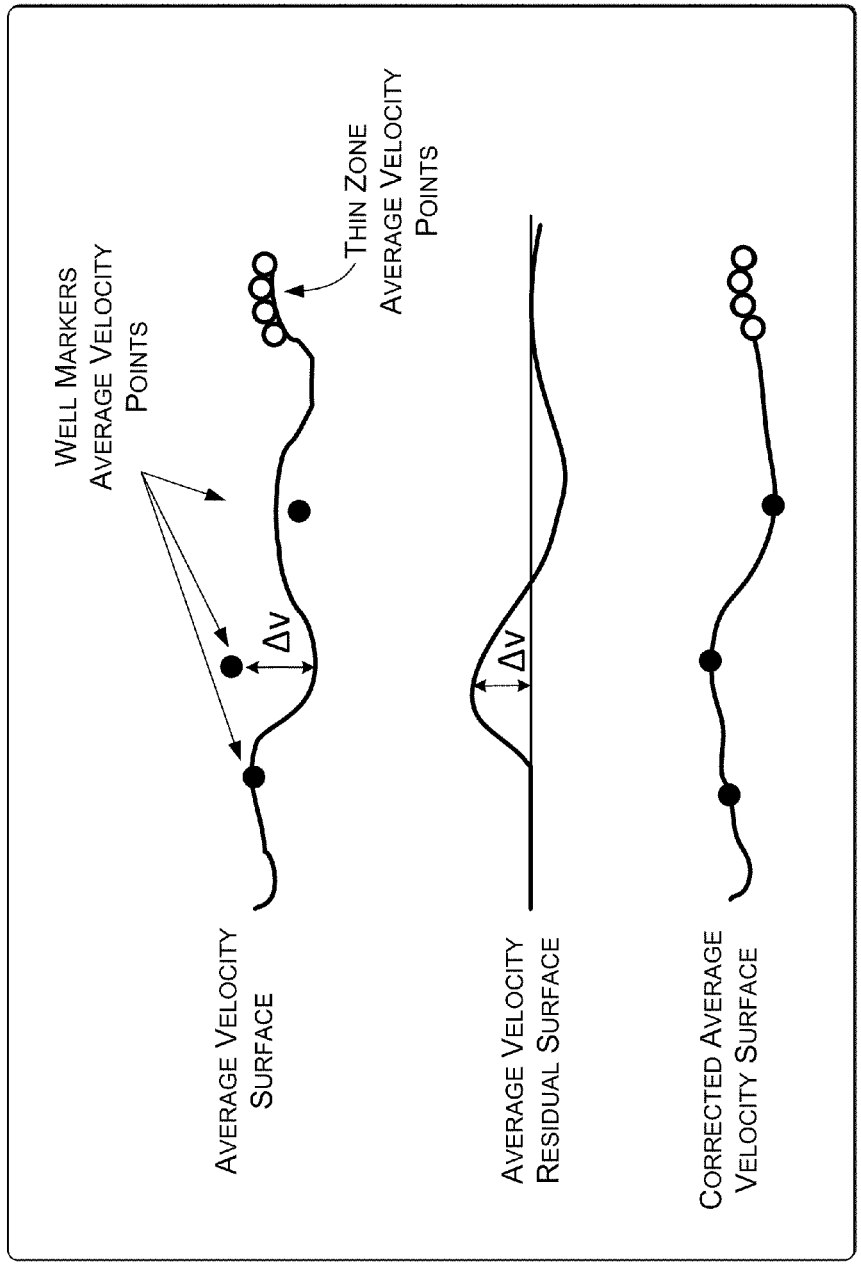
FIG. 12 is a diagram of example average velocity surface correction.
Figure 13:
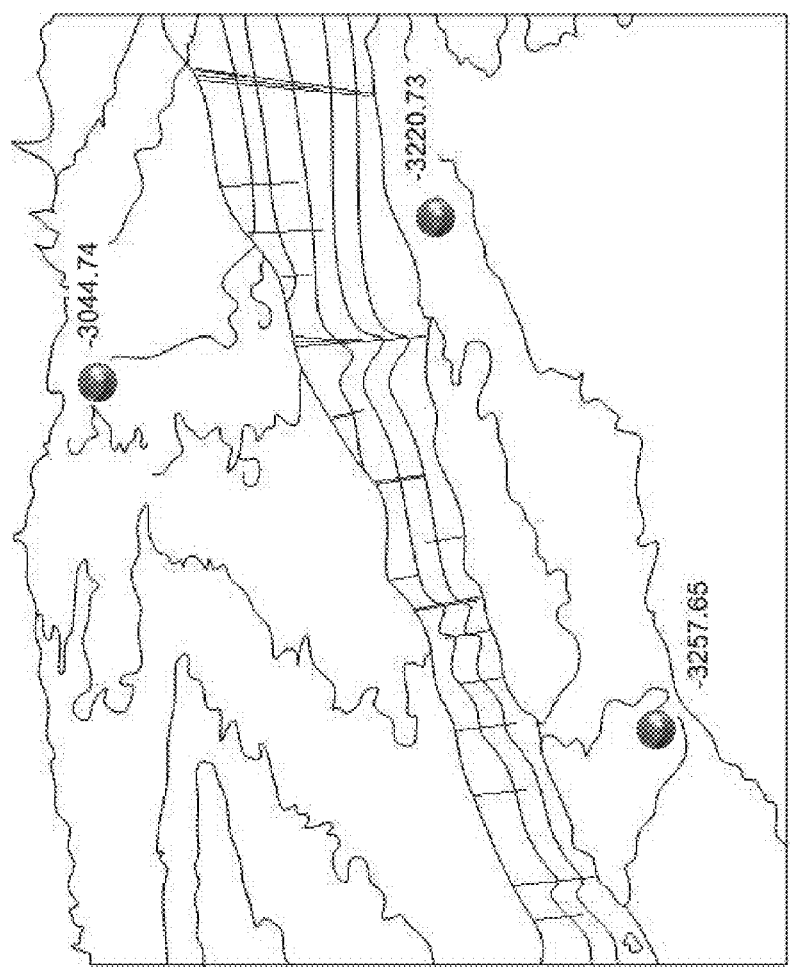
FIG. 13 is a diagram of example well markers matched to depth horizons after exact correction.

At this point, it is now possible to calculate corrected average velocity surfaces at all the horizons, as shown in FIG. 12. The average velocity surfaces correction calculator 712 first calculates residual points between the extracted average velocity surfaces and the extracted average velocity points from well markers 110 and thin zones. This can be achieved through Equation (7):

$$r = \bar{v}_P - \bar{v} \qquad (7)$$

where r is the residual. As shown in FIG. 12, the residual points can be used to grid a residual surface for each horizon. The average velocity surfaces correction calculator 712 adds each residual surface to the corresponding extracted average velocity surface to provide a corrected average velocity surface for each horizon, as given in Equation (8):

$$\bar{v}_C = \bar{v} + r \qquad (8)$$

where $\bar{v}_C$ is the corrected average velocity surface.

Next, the correction factor surfaces calculator 714 calculates a correction factor surface for each horizon by applying Equation (9):

$$f = \frac{\bar{v}_C}{\bar{v}} \qquad (9)$$

where f is a factor surface, $\bar{v}_C$ is the corrected average velocity surface, and $\bar{v}$ is the uncorrected average velocity surface.

The velocity cube correction calculator 716 now operates on the average velocity cube 200. The corrected average velocity is calculated for each cell in the new velocity cube 200 by applying Equation (10), and by finding the zone that contains each cell center (x,y,t) of the average velocity cube 200, in order to be able to use the surfaces that correspond to each zone:

$$\bar{v}_C = f(x,y,t)\bar{v} \qquad (10)$$

where f(x,y,t) for each zone is given by Equation (11)

$$f(x, y, t) = f_B(x, y) + \frac{(f_T(x, y) - f_B(x, y))}{(t_T(x, y) - t_B(x, y))}(t(x, y) - t_B(x, y)); \qquad (11)$$

where $f_B(x,y)$ is the interpolated value at the base horizon factor surface, $f_T(x,y)$ is the interpolated value at the top horizon factor surface, $t_B(x,y)$ is the interpolated time value at the base horizon, and $t_T(x,y)$ is the interpolated time value at the top horizon.

The exactitude engine 718 now performs exact correction to the well markers 110. As mentioned above, it is very important that the depth-converted horizons match the well markers in depth 902, as shown in FIGS. 9-10. This is because the well markers 902 are hard data and it is known where the horizons should occur at these vertices.

The action of the components of the velocity field correction engine 112 thus far have produced an average velocity cube 200 that provides a good fit to the well markers 110, but is still not accurate enough. The exactitude engine 718 now performs an exact correction to the hard data of well markers 110.

The exactitude engine 718 first groups the well markers 110. That is, well markers 110 that are in neighbouring cells are placed into the same group.

Next, the exactitude engine 718 estimates the average velocity in cells surrounding the well markers 110. This average velocity can be estimated by minimizing the error in average velocity for each well markers group. A measure of the quality of the fit is desirable and can be obtained from standard deviation in Equation (12):

$$E = \sqrt{\frac{S}{m}} \quad (12)$$

where E is the error and m is the number of well markers in each group. To estimate the best combination of average velocity cell values, the exactitude engine 718 minimizes the summed squares of residuals. The summed square of residuals is given in Equation (13):

$$S = \sum_{j=1}^{m} r_j^2 \quad (13)$$

where r is the residual. The average velocity residual is then given by Equation (14):

$$r = \bar{v}_I - \bar{v}_M \quad (14)$$

where $\bar{v}_I$ is the interpolated average velocity cube value given by Equation (1), and $\bar{v}_M$ is the average velocity value at a given well marker 110. By inserting Equation (1) and Equation (14) into Equation (13), the summed squares of residuals can be written as in Equation (15):

$$S = \sum_{j=1}^{m} \left( f(\bar{v}_{NC_1}, \bar{v}_{NC_2}, \ldots, \bar{v}_{NC_n}, x_{M_j}, t_{M_j})_j - \bar{v}_{M_j} \right)^2 \quad (15)$$

The transcendental nature of this relation prevents solving by isolating $\bar{v}_{NC_1}, \bar{v}_{NC_2}, \ldots, \bar{v}_{NC_n}$. However, the exactitude engine 718 can apply a standard minimum method to find the minimum of Equation (15). The exactitude engine 718 then updates the average velocity cube 200 with the estimated average velocity cell values. This provides an average velocity cube 200 with time horizon data that match the hard data of the markers in depth 902.

Example Methods

Figure 14:
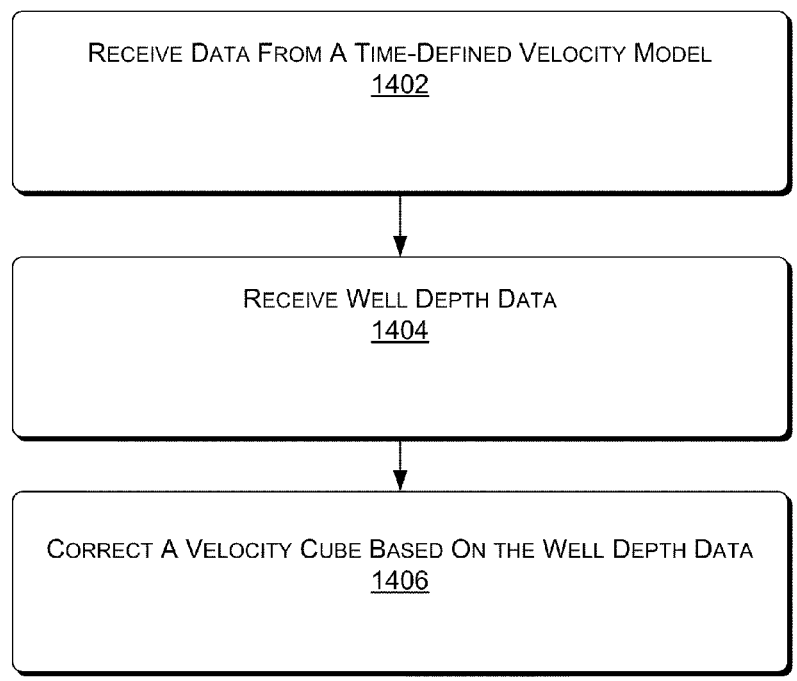
FIG. 14 is flow a diagram of an example method of correcting an average velocity cube.

FIG. 14 shows an example method of correcting an average velocity cube. In the flow diagram, the operations are summarized in individual blocks. The example method 1400 may be performed by hardware or combinations of hardware and software, for example, by the example velocity field correction engine 112.

At block 1402, data is received from a velocity model defined in the time domain.

At block 1404, well depth data is received.

At block 1406, a velocity cube is corrected to match the well depth data. This process may include extracting average velocity surfaces of time horizons, e.g., using an interpolation function; extracting average velocities for well markers; and reconciling the average velocity surfaces of the time horizons with the velocities of the well markers. Correction factor surfaces can then be calculated for the time horizons and the average velocity cube updated accordingly.

Figure 15:
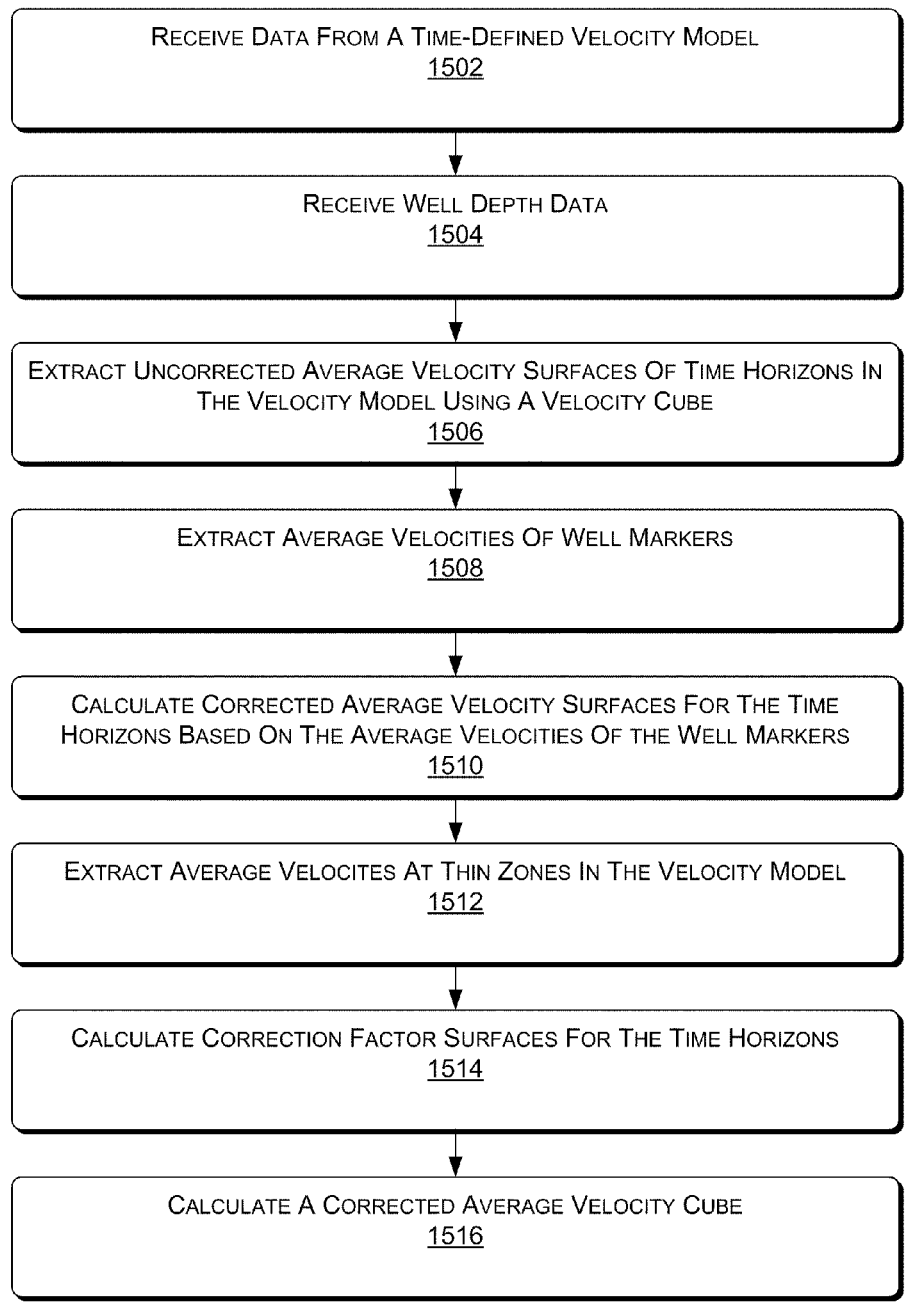
FIG. 15 is a flow diagram of another example method of correcting an average velocity cube.

FIG. 15 shows another example method of correcting an average velocity cube. In the flow diagram, the operations are summarized in individual blocks. The example method 1500 may be performed by hardware or combinations of hardware and software, for example, by the example velocity field correction engine 112.

At block 1502, data is received from a time-defined velocity model.

At block 1504, well depth data is received.

At block 1506, uncorrected average velocity surfaces of time horizons in the velocity model are extracted using a velocity cube of the velocity model.

At block 1508, average velocities of well markers are extracted.

At block 1510, corrected average velocity surfaces for the time horizons are calculated based on the average velocities of the well markers.

At block 1512, average velocities at thin zones in the velocity model are extracted. This process ensures that the average velocity is satisfactorily equal for all horizons in the thin zones. If not, there is a risk of generating an incorrect average velocity cube, and also generating spiky depth horizons in the thin zones. In one implementation, this step extracts time thickness surfaces and then calculates the average velocity surfaces in the thin zones. Nodes in the surfaces can be converted to points, and the points added to the well marker points.

At block 1514, correction factor surfaces are calculated for the time horizons.

At block 1516, a corrected average velocity cube is calculated, based on the correction factor surfaces.

FIG. 16 shows an example method of exact correction of time horizons to well data in an average velocity cube. In the flow diagram, the operations are summarized in individual blocks. The example method 1600 may be performed by hardware or combinations of hardware and software, for example, by the example velocity field correction engine 112.

At block 1602, well markers represented in neighbouring cells of an average velocity model/cube are grouped. It is important that the depth-converted horizons match the well markers in depth. This is because the well markers are hard data and thus where the horizons should be at these vertices is known.

At block 1604, an average velocity in cells that surround each well marker group is estimated by minimizing an error in average velocity for each group. A measure of the quality of the fit can be obtained from standard deviation. To estimate the best combination of average velocity cell values the summed squares of residuals can be employed. A standard minimum-finding method can be applied to solve the summed squares of residuals.

At block 1606, the average velocity cube is updated with the estimated average velocity cell values to correct time horizons in the average velocity cube to the well markers. This provides an average velocity cube that gives a good match to well markers in depth.

Conclusion

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed systems, methods, and structures.

The invention claimed is:

1. A method, comprising:
receiving data from a velocity model for seismic modeling, the velocity model representing a subsurface earth volume in a time domain;
receiving well depth data associated with the subsurface earth volume;
extracting uncorrected average velocity surfaces of time horizons in the velocity model using a velocity cube of the velocity model;
extracting average velocities at well markers in the well depth data; and
correcting, using a processor, a velocity object of the velocity model in accordance with the well depth data, wherein correcting the velocity object comprises:
calculating corrected average velocity surfaces for the time horizons based on the average velocities at the well markers;
calculating correction factor surfaces for the time horizons;
calculating a corrected average velocity cube;
combining well markers in neighboring cells of the corrected average velocity cube into groups;
estimating average velocity values in cells that surround the well markers in the corrected average velocity cube by minimizing an error in average velocity for each of the groups; and
updating the corrected average velocity cube with the average velocity values estimated in the cells that surround the well markers, to reconcile the time horizons in the average velocity cube with the well depth data.

2. The method of claim 1, wherein the velocity object comprises an average velocity cube of the velocity mode, or an instantaneous velocity cube of the velocity model, or both.

3. The method of claim 1, further comprising extracting an average velocity at a thin zone in the velocity model.

4. A system for improving a velocity model defined in a time domain for seismic modeling, comprising:
a computer with at least one processor;
a memory storing a program of instructions;
a velocity field correction engine having instructions storable in the memory and executable in the processor to correct an average velocity cube associated with the velocity model in accordance with well depth data; and
a thin zone extractor configured to determine that one or more average velocities correspond to one or more horizons in one or more thin zones of the velocity model, and to equalize the one or more average velocities of the one or more horizons in the thin zones.

5. The system of claim 4, further comprising:
a first extractor to obtain uncorrected average velocity surfaces of time horizons from the velocity model;
a second extractor to obtain average velocities for well markers from the well depth data; and
a first calculating component to provide corrected average velocity surfaces for the time horizons based on the average velocities of the well markers.

6. The system of claim 4, further comprising:
a correction factor surface calculating component to obtain correction factor surfaces for the time horizons; and
an average velocity cube correcting calculating component to correct the average velocity cube.

7. The system of claim 6, further comprising an exactitude engine to correct the time horizons to the well markers, wherein the exactitude engine:
combines each set of well markers in adjacent cells of the average velocity cube into an individual group;
obtains an average velocity in cells within a radius of each individual group of well markers by minimizing an error in average velocity for each individual group; and
corrects the average velocity cube with the obtained average velocities such that the time horizons match the well depth data.

8. A non-transitory machine readable storage medium embodying a set of machine executable instructions that when executed by a machine perform a method of correcting a velocity cube in a velocity model for seismic modeling, the method comprising:
receiving a velocity model defined in the time domain for seismic modeling;
receiving well data associated with the velocity model; and
updating an average velocity cube associated with the velocity model to fit depth-converted horizons to the well data, wherein updating the average velocity comprises:
obtaining corrected average velocity surfaces by calculating residual points between the extracted average velocity surfaces and the extracted average velocity points from well markers and thin zones using:

$$r = \bar{v}_p - \bar{v}$$

where r is a residual point, $\bar{v}_p$ represents the points to be used in updating the average velocity cube, and $\bar{v}$ is an uncorrected average velocity surface.

9. The machine readable medium of claim 8, wherein the method further comprises extracting average velocity surfaces $\bar{v}_s$ for time horizons using an interpolation routine.

10. The machine readable medium of claim 9, wherein the method further comprises extracting an average velocity from each well marker in the well data by applying $$\bar{v}_M = \frac{z_M - z_D}{t_B - t_D}$$

where $z_M$ is a depth at a corresponding well marker, $t_B$ is a corresponding time at a corresponding base horizon, $z_D$ is a depth at a datum, $t_D$ is a time at the datum, and $\bar{v}_M$ is the average velocity at the well marker.

11. The machine readable medium of claim 10, wherein the method further comprises:
extracting time thickness surfaces from thin zones in the velocity model by applying $$\Delta t = |t_2 - t_1|$$

where $t_2$ is a time at the base horizon and $t_1$ is a time at the top horizon;
calculating average Velocity surfaces in the thin zones by applying $$\overline{v}_{\Delta t \leq \alpha} = \begin{cases} \overline{v}_T, & \Delta t \leq \alpha \\ UNDEF, & \Delta t > \alpha \end{cases}$$

where $\overline{v}_{\Delta t \leq \alpha}$ is an average velocity in the thin zones, $\overline{v}_T$ is an average velocity at the top horizon, and $\alpha$ is a thickness tolerance;
  converting nodes in the average velocity surfaces to points; and
  adding the points to well marker points by applying $$\overline{v}_P = \overline{v}_M + \overline{v}_{\Delta t \leq \alpha}.$$

12. The machine readable medium of claim 8, wherein the method further comprises:
  using the residual points to grid a residual surface for each horizon; and
  adding each residual surface to a corresponding extracted average velocity surface to provide a corrected average velocity surface for each horizon, using:

$$\overline{v}_c = \overline{v} + r$$

where $\overline{v}_c$ is the corrected average velocity surface.

13. The machine readable medium of claim 12, wherein the method further comprises:
  calculating a correction factor surface for each horizon by applying $$f = \frac{\overline{v}_c}{\overline{v}}$$

where f is a factor surface;
  calculating a corrected average velocity for each cell in the average velocity cube; and
  finding a zone that contains each cell center (x, y, t) of the average velocity cube;
  using surfaces that correspond to each zone, wherein calculating the corrected average velocity for each cell in the average velocity cube uses $$\overline{v}_c = f(x, y, t) \overline{v}$$

where f (x, y, t) for each zone is given by $$f(x, y, t) = f_B(x, y) + \frac{(f_T(x, y) - f_B(x, y))}{(t_T(x, y) - t_B(x, y))}(t(x, y) - t_B(x, y));$$

where $f_B(x, y)$ is an interpolated value at a corresponding base horizon factor surface, $f_T(x, y)$ is an interpolated value at a corresponding top horizon factor surface, $t_B(x, y)$ is an interpolated time value at the base horizon, and $t_T(x, y)$ is an interpolated time value at the top horizon.

14. The machine readable medium of claim 13, wherein the method further includes improving the correction of the time horizons to the well markers, comprising:
  grouping the well markers that neighbor each other in nearby cells of the average velocity cube into well markers groups;
  estimating an average velocity in cells surrounding the well markers by minimizing an error in average velocity for each well markers group, including estimating a best combination of average velocity cell values by minimizing a summed squares of residuals, given by $$S = \sum_{j=1}^{m} r_j^2$$

wherein r is the residual, and wherein the average velocity residual is given by
wherein $\overline{v}_I$ is an interpolated average velocity cube value, $\overline{v}_M$ is an average velocity value at a given well marker, and wherein the summed squares of residuals to be minimized is given by $$S = \sum_{j=1}^{m} \left( f\left(\overline{v}_{NC_1}, \overline{v}_{NC_2}, \ldots, \overline{v}_{NC_n}, x_{M_j}, y_{M_j}, t_{M_j}\right)_j - \overline{v}_{M_j} \right)^2; \text{ and}$$

updating the average velocity cube with the estimated average velocity cell values.

\* \* \* \* \*